United States Patent
Lowans

(10) Patent No.: US 7,067,784 B1
(45) Date of Patent: Jun. 27, 2006

(54) PROGRAMMABLE LENS ASSEMBLIES AND OPTICAL SYSTEMS INCORPORATING THEM

(75) Inventor: Brian S Lowans, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/787,767

(22) PCT Filed: Sep. 24, 1999

(86) PCT No.: PCT/GB99/03000

§ 371 (c)(1),
(2), (4) Date: Mar. 22, 2001

(87) PCT Pub. No.: WO00/17810

PCT Pub. Date: Mar. 30, 2000

(30) Foreign Application Priority Data

Sep. 24, 1998  (GB)  ................ PCT/GB98/02876

(51) Int. Cl.
*G02B 7/04* (2006.01)
(52) U.S. Cl. .................................. 250/201.5; 250/226
(58) Field of Classification Search ............ 250/201.2, 250/201.5, 226; 396/77, 79, 82; 348/208.99, 348/208.12, 208.13
See application file for complete search history.

(56) References Cited

U.S. PATENT DOCUMENTS 5,616,912 A * 4/1997 Robinson et al. ........ 250/201.1

OTHER PUBLICATIONS

Database Inspec 'Online! Institute Of Electrical Engineers, Stevenage, GB Lambert A. et al.; "Optical image processing using liquid crystal displays" Database accession No. 5774678 & Coonference Proceedings DICTA-95. Digital Image Computing: Techniques and Applications, Conference Proceedings DICTA-95. Digital Image Computing: Techniques and Applications, Brisbane, Qld., Australia, 12/1995, pp. 354-359, 1995, Brisbane, Qld., Australia, Australian Pattern Recgnition Soc. Australia.

Qing Tang, et al.: "Multiple-Object Detection Wtih A Chirp-Encoded Joint Transform Correlator" Applied Optics, US, Optical Society Of Amercia, Washington, vol. 32, No. 26, pp. 5079-5088.

Manasson V A et al.: "Optically Controlled Scanning Antenas Comprising A Plasma Grating" IEEE Antennas And Propagation Society International Symposium, US, New York, NY: IEEE, pp. 1228-1231.

* cited by examiner

*Primary Examiner*—Georgia Epps
*Assistant Examiner*—Tony Lu
(74) *Attorney, Agent, or Firm*—Nixon & Vanderhye P.C.

(57) ABSTRACT

An imaging system (10) has a fixed lens combination (22), a spatial light modulator (SLM) (20) and a linear detector array (12). A scene image is scanned across a simple array (12) in a direction perpendicular to the array (12) by the SLM (20). This is achieved by displaying a diffraction pattern on the SLM that changes to achieve the scanning. The diffraction pattern displayed typically has a linear element (40) and a quadratic element (42). By having a programmably changed combined chirp pattern (36) displayed on the SLM, and by being able to change it thousands of times a second, an army with fast read out can take the place of a 2-D imaging array.

14 Claims, 7 Drawing Sheets

SEPARATE LINES OF DETECTORS IN PARRALLEL, POSSIBLY READ OUT IN OPPOSITE DIRECTION FOR ADJACENT LINES.

Analogue Linear Pattern

Analogue Quadratic Pattern

Analogue Cubic Pattern

Binary Combined Linear + Quadratic Pattern

Binary Combined Quadratic + Cubic Pattern

PROGRAMMABLE LENS ASSEMBLIES AND OPTICAL SYSTEMS INCORPORATING THEM

This application is the US national phase of international application PCT/GB99/03000, filed in English on 24 Sep. 1999, which designated the US. PCT/GB99/03000 claims priority to PCT/GB98/02876 filed 24 Sep. 1998. The entire contents of these applications are incorporated herein by reference.

This invention relates to programmable lens assemblies and optical systems that incorporate them.

It is sometimes desirable to be able to alter the field of view, or plane within a field of view, that is focused by an optical system (or optical assembly) to a focal plane. For example a detector, or array of detectors (e.g. pixellated camera detector), may be provided and may have an imaging plane at which it detects an image, and it may be desirable to change what plane in 3-D space it is that is focused by the optical elements of the assembly onto the imaging plane.

This is conventionally achieved by mechanical movement of lenses. To direct the optical system to detect from a different angle it is known to point the optical assembly to a different angle, or design a system with a wide field of view.

According to a first aspect the invention comprises an optical assembly having an optical input, a spatial light modulator (SLM), a controller (e.g. a computer or microprocessor controller) controlling the display of the SLM, and a detector; the controller being adapted to modify a pattern displayed on the SLM so as to cause the SLM, in use, to control the radiation incident upon the SLM from the optical input so as to focus onto the detection radiation from a computer-selected surface or region in 3-D space in the scene that the optical assembly is observing.

Thus, the pattern (such as a diffraction pattern, reflection pattern or refraction pattern) exhibited by the SLM is programmed by the computer/controller and is in some embodiments capable of being changed rapidly.

The pattern on the SLM is programmed to change under the control of the controller, but the SLM and detector remain fixed relative to each other. The assembly may have no moving mechanical optical parts that move grossly relative to the detector.

Preferably the SLM has a rate at which its display can be changed and the controller is capable of programming the pattern to change at substantially as fast a rate as that at which the display of the SLM is capable of being changed.

The pattern on the SLM may be changed at least as fast as once an hour, once a minute, once a second, or ten times a second, or one hundred times a second, or one thousand times a second or ten thousand times a second, or one hundred thousand times a second, or faster, or at a rate that is in a range defined between any of the above points.

Preferably the pattern displayed, in use, is (i) substantially a linear pattern, or (ii) substantially a quadratic or higher order pattern, or (iii) a combination of (i) and (ii). It may be desirable to change a pattern from being a true linear pattern or a true quadratic, cubic, or higher order pattern (or a combination of such true patterns) to a pattern that is substantially similar but modified to have modified performance.

Preferably the pattern has a component composed of a substantially linear diffraction grating pattern and/or a component comprised of a quadratic chirp function. The diffraction and chirp patterns may be binary, or have more levels of quantisation. The patterns may vary the phase or amplitude of incident light, or both.

Preferably the controller has a library of possible linear and/or chirp functions. Preferably a selected combination of linear and chirp functions from the library are, in use, applied to the SLM. Alternatively the controller, or some other device, may calculate the patterns, preferably in real time. However, a library is preferred.

Preferably the detector comprises a line array of detector elements. There may be a plurality of detector elements in the array, or only one (single element array). Preferably the controller is adapted to control the display on the SLM to scan the scene image over the detector array, preferably in a direction generally transverse to the direction of the linear array. The linear array may comprise a straight line, linear, array, but it may comprise a simple array.

Preferably, the controller is adapted to scan different angular portions of the scene (angularly disposed in azimuth and/or altitude/ascension relative to the optical axis of the assembly) by modifying the linear component of a combined pattern on the SLM.

It may be possible to image any point or combination of points in a 3-D space onto the detector, which may be a single element.

Preferably the controller is adapted to focus different depth regions of 3-D scene space over the detector by controlling the SLM to display patterns with different chirp functions. The chirp function may provide a scanning focus in the z direction, depth.

According to another aspect the invention comprises a programmable focus element assembly which includes a programmable SLM capable of displaying light-modulating patterns which in use control the depth focus and direction from which light is focused by the lens assembly.

This is achieved preferably in real time. Preferably many different focus arrangements are exhibited on the SLM each second.

According to another aspect the invention comprises the use of a linear grating and/or a chirp grating exhibited on a programmable SLM to control the part of a scene that is directed onto a detector. The part of the scene may be focused or imaged onto the detector.

Preferably a point, or points, in 3-D space are focused onto a detector, the SLM being programmed by the controller. Preferably many points per second (e.g. thousands) are focused onto the detector.

According to a further aspect the invention comprises a method of directing a scene image onto a detector comprising using a programmed SLM to control the x-y part of the scene image that is directed onto the detector and/or the depth of the plane of the scene in the z direction that is directed onto the detector, the scene-detector direction being in the z direction.

The plane in the scene that is projected onto the detector may be focused onto the detector. However, for some applications it may not be in focus on the detector, for example it may be slightly out of focus.

Preferably a chirp is applied to the SLM. Preferably a linear grating is applied to the SLM. Alternatively, patterns that are substantially a chirp or substantially a linear grating, or substantially a combination of them, may be applied to the SLM.

Preferably the orientation of the linear grating and/or the spacing of the lines of the grating are controlled so as to control the off-z axis location of region of the scene that is directed onto the detector. Preferably the chirp is used to determine the distance from the detector of the plane in 3-D space in the scene that is focused to the detector.

Preferably the display on the SLM is programmably controlled so as to scan the scene image over the detector over time, with the detector taking time-spaced records of what it detects. Preferably, the detector is a line detector, as opposed to a 2-D array of detectors (but it could be a 2-D array).

Preferably the programmed SLM compensates for aberration in an optical system.

According to another aspect the invention comprises an optical system having an aberration, and a programmed SLM which compensates for the aberration.

The compensation may be partial or substantially total compensation.

According to another aspect the invention comprises a method of producing an image comprising having a detector and scanning portions of a scene over the detector so that the detector detects scene information relating to different scene portions at sequential times, and building up an image representative of the scene by reading the detector to read the detected signals representative of each scene portion and producing an image from the time-spaced read-outs of the detector.

Preferably the method comprises having a simple detector array. This facilitates fast read-out.

Preferably, the method comprises using an SLM, preferably computer-controlled, to control radiation incident from the scene to effect the scanning of the scene portions over the detector.

Preferably, the method comprises increasing or decreasing the number of pixels in the image by scanning more, or less, than the scene is scanned when fewer, or more, pixels in the image are required.

Preferably, the method comprises increasing, or decreasing, the resolution of the image by scanning more, or less, than the scene is scanned for a lower resolution image. The image may be a 2-D image or a 3-D image.

Preferably, the method comprises increasing or decreasing the field of view of an optical assembly by scanning the scene across a greater or smaller extent in the x-y plane of the scene.

According to another aspect, the invention comprises imaging apparatus having a detector and a scanner, the scanner being adapted to scan parts of a scene over the detector, with radiation from different parts of the scene being directed onto the detector at different times, and a detector read-out adapted to read out signals from the detector and provide them to an image compiler, with signals at different times representing different parts of the scene, and the image compiler being adapted to create an image of the scene from the read-out signals.

Preferably, the scanner is adapted to scan the scene in 3-D space and direct radiation from different 3-D volumes in the scene space onto the detector. The image may be a 3-D image. The scanner may comprise an SLM. The SLM may be controlled by control means to display light-modulating patterns which effect the scanning of the scene over the detector. The SLM may be controlled to display combined chirp patterns (substantially linear and substantially quadratic or higher function).

Preferably, the controller is adapted to control the SLM to scan parts of the scene over the detector at a fast rate. The rate of scan may be of the order of one thousand, ten thousand, or one hundred thousand (or more) parts of the scene projected onto the detector per second.

The detector may comprise a single detector element or an array of detector elements, such as a 1-D or 2-D array. The detector may comprise a simple array of detector elements.

The apparatus may be adapted to change the resolution of the image formed by the image computer by altering the scanning of the parts of the scene over the detector. If the scene is scanned onto the detector elements with finer "scene pixel"/smaller parts of the scene incident on the detector at any one time, the resolution of the image will be improved. If the scene is scanned so that a greater area in the x-y plane of the scene (scene to detector direction being the z direction), then a wider field of view will be "seen" by the detectors and the image produced by the image computer can have a wider field of view.

The apparatus may comprise a camera.

The apparatus may be adapted to be able to change the aperture size of the imaging system. An aperture size changer provided to do this may comprise an element in its own right, and may be a mechanical element, or it may comprise an SLM, or part of an SLM, controlled by the controller. There may be an additional SLM to perform the aperture size change. The aperture changer may have an aperture definer that has binary states (block/clear) or may have grey levels between block/clear.

Post-detection processing by the image computer may improve the resolution of the apparatus. One region of the scene directed onto a detector element of the detector may not, after post-processing, correspond to one image pixel in the image produced. Image pixel averaging, weighting, or other post-image-capture processing may take place.

According to another aspect the invention comprises the use of a scanning device in an imaging system to scan parts of the scene over an image-capturing detector at different times so as to build up a pixel image of the scene.

The scanning is preferably used to control the scene pixel size that is scanned onto the detector. The scanning is preferably used to control the number of pixels produced in the image generated.

Embodiments of the invention will now be described by way of example only, with reference to the accompanying drawings of which:—

FIG. 1 schematically shows an optical assembly according to the present invention;

FIGS. 2 and 3 schematically shows other optical assemblies;

The reader is directed at this point to read our co-pending patent application PCT/GB98/02876. The disclosure and contents of PCT/GB98/02876 are hereby incorporated by reference into the disclosure of this patent application. Pending PCT/GB98/02876 will assist the reader in appreciating some terms used in the present application, and in appreciating how some features of some of the embodiments work.

Figure 1:
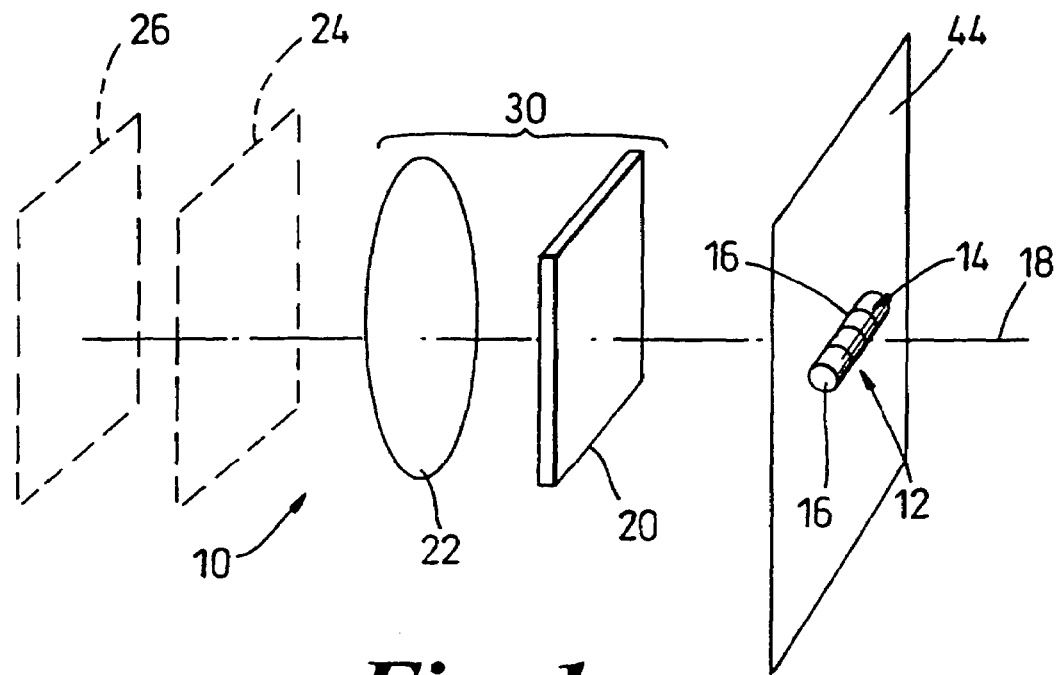
Figure 4:
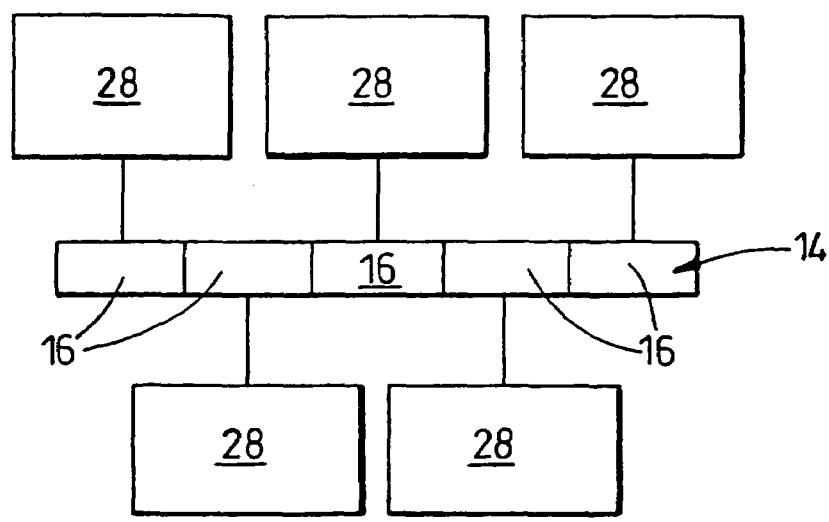
FIG. 4 shows a detail of the assemblies of FIGS. 1 to 3.

FIG. 1 shows an optical assembly 10 having: a detector or sensor 12, in this case an array 14 (linear in this example) of sensors 16 extending orthogonally to an optical axis 18 (the array 14 is best shown in FIG. 4); a Spatial Light Modulator 20 (SLM); a focusing, light-gathering, lens 22; and a first imaged plane 24 and a second imaged plane 26 at a different distance along the optical axis 18 from the SLM 20. In this example the sensors 16, SLM 20 and lenses 22 are all mounted in fixed relationship relative to each other, possibly on a framework (not shown). The lens 22 (or some other light-gatherer) may have substantially the same area as the SLM, but it may have a greater, possibly much greater, area. They may be one, two, or a greater number of lenses in the optical assembly.

FIG. 4 shows the linear array 14 in more detail and shows that each sensor 16 ideally has its own read out circuitry 28 (embodiments where this is not so are also envisaged, but it is preferred to have each sensor read out in parallel, possibly independently). In some embodiments the circuitry 28 also performs signal processing on the read out signals from the sensors 16. The sensors 16 can be read simultaneously in parallel. It will be noted that because there is a 1-D array 14, and not in 2-D array, there is far more space for the electronics associated with the sensors. The electronics 28 and the sensors 16 may be provided on a common semi-conductor chip (not shown).

The SLM in the embodiment of FIG. 1 is a computer-controlled transmissive SLM capable of displaying computer-controlled patterns. The SLM 20 and the lens 22 comprise a programmable lens assembly, referenced, 30. There are many possible optical arrangements of lenses plus the SLM.

Figure 5:
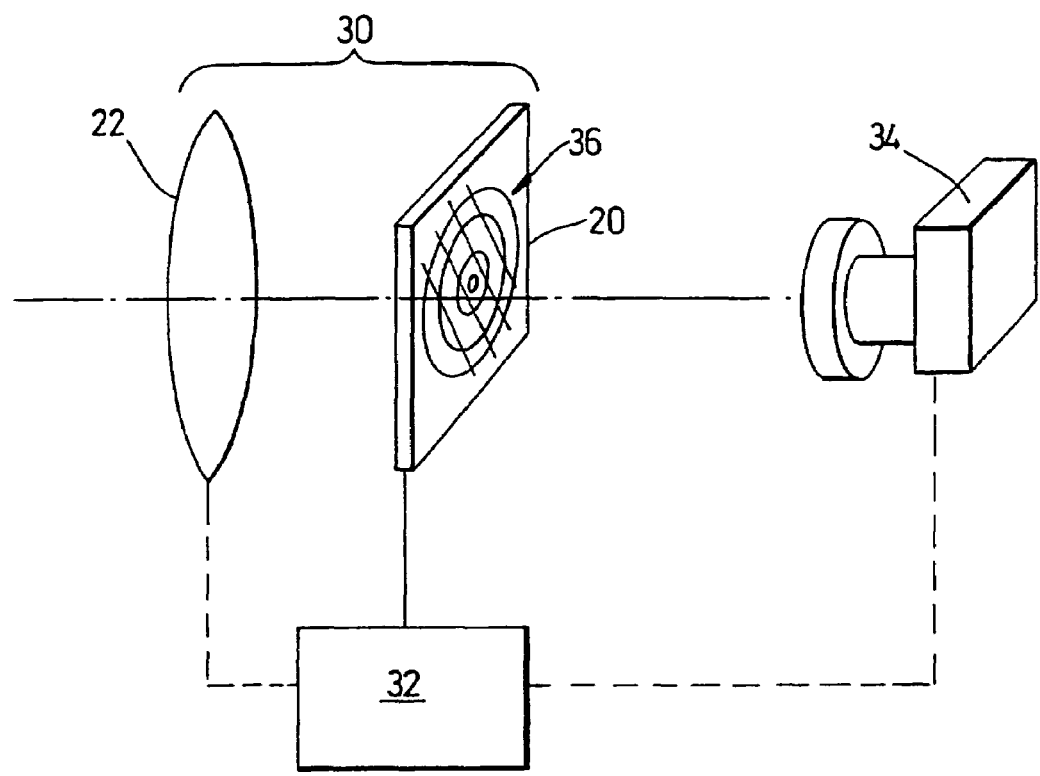
FIG. 5 shows schematically another optical assembly.

FIG. 5 illustrates the programmable lens assembly 30, a computer or microprocessor 32 controlling the SLM 20, and sensor 12, this time represented as a camera 34 (but it could be the array 14). The camera 34 may for example be a CMOS camera, or a CCD camera, or a photographic film camera, or a camera with the read-out of FIG. 4.

The lens 22 and/or the sensor/camera 34 may also be controlled by the computer 32 (or they may not be). In some embodiments the lens 22 may be omitted. There may in the lens assembly 30 only be a SLM as an optical component with significant focusing power.

The lens 22 collects light from a scene and directs it (typically partially focuses it) onto the SLM 20. The SLM 20 has displayed on it a pattern 36 generated by the computer 32.

Figure 7:
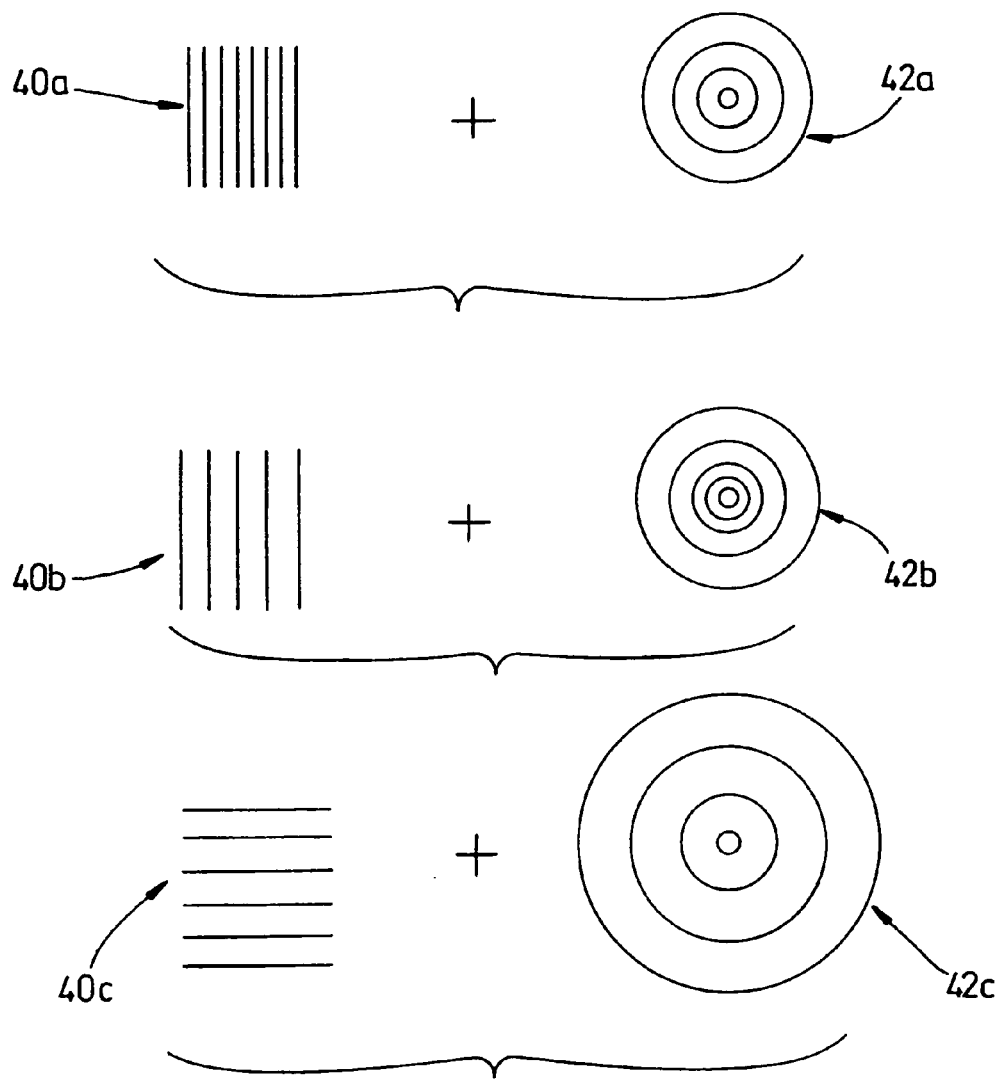
FIG. 7 shows schematically a number of different patterns held in a computer database.

The pattern 36 is schematically illustrated in FIG. 7. The computer 32 has in its memory a library of possible combinations of linear diffraction grating 40 (a to c) and quadratic (or higher order) chirp grating 42 (a to c). There may be two elements to the combination or more than two. A particular combination, for example pair 40a and 42a, are selected by the computer and displayed simultaneously on the SLM 20. The combined pattern may be thought of as a combined chirp.

The quadratic chirp 42a acts as a focusing lens as light encounters it on the SLM and focuses light onto a focal or imaging plane, referenced 44, which contains the linear array 14 of detectors. The choice of chirp 42 determines which plane in 3-D space, 24 or 26 (or other), is the plane that is imaged on to the imaging plane 44.

The diffraction grating 40 part of the pattern 36 determines how off-optical axis 18 is the centre point of the imaged plane in 3-D space, and in what angular direction away from the optical axis it lies. For example, if the grating 40 has infinite spacing between its lines (i.e. no grating 40) the centre of the imaged plane/imaged scene will lie on the optical axis 18. The closer the spacing between lines of the grating 40 the further away from the axis 18 lies the centre of the field of view projected onto the imaging plane 44 the sensor array 14. The direction in which the lines of the grating 40 extend, relative to the optical axis, controls the angular direction of displacement of the centre of the projected field of view/displacement of the part of the scene that is focused onto the detector.

FIG. 12 shows a number of patterns. When a combined pattern is formed it is believed necessary to combine the linear (or near linear) and chirp (or near chirp or higher order) patterns as analogues to form an analogue combined chirp and then binarise it (if a binarised combined chirp is to be provided at all). Binarising the linear pattern and chirp and then combining the binarised patterns does not work well. Similar comments apply to higher levels of quantisation.

Figure 6:
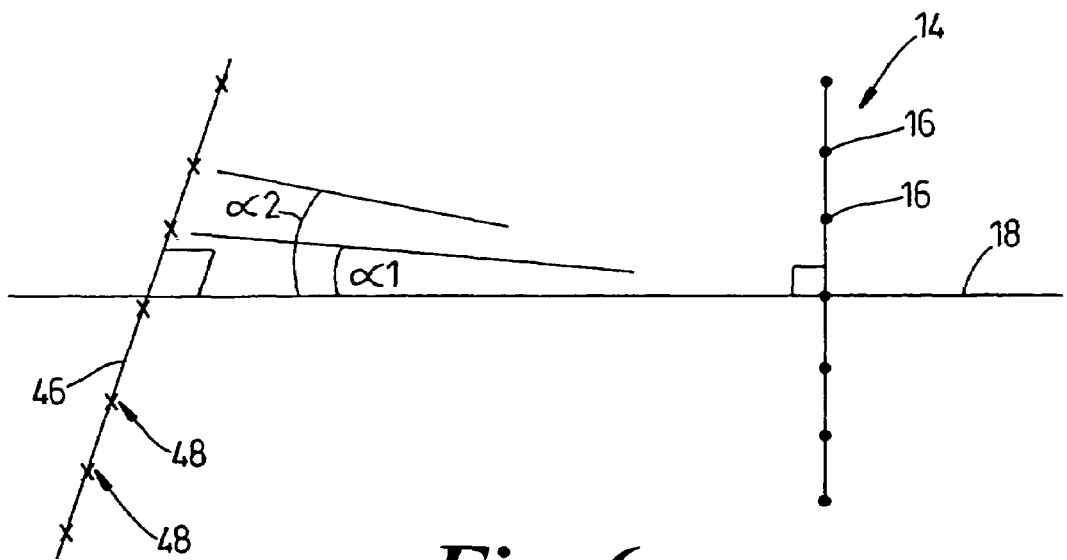
FIG. 6 illustrates schematically a principle of operation of some embodiments of the present invention.

For example, FIG. 6 shows a linear array 14 of sensors 16 extending vertically in the page, and the optical axis 18. It also shows a line 46 of centres 48 of fields of view displaced at different angles (for example $\alpha 1$ and $\alpha 2$) from the optical axis. The line 46 is orthogonal (or otherwise transverse) to the optical axis 18, and to the line of sensors 16. By altering the linear grating component of the combined chirp displayed on the SLM 20 it is possible to scan the centre of field of view projected onto the line of sensors 16 along the line 46 (or through different angles $\alpha 1$, $\alpha 2$, etc.). For each angle $\alpha$ (or centre of field of view 48) the sensors 16 detect a vertical "slice" of the scene image in the imaged plane. As the angle $\alpha$ is changed and sensors 16 capture vertical "slices" from different transverse (in this case orthogonal) regions of the image in the imaged plane. Thus the schematic arrangement shown in FIG. 6 captures seven vertical slices of the imaged plane in the field of view, at different angles across the field of view.

It is possible to use a 1-D array of sensors to build up a 2-D picture of a scene by scanning the part of the scene that falls upon the 1-D array of sensors across the sensors in a direction transverse (e.g. orthogonal) to the sensors. It is also possible to use a single detector/sensor, or to use a 2-D array of detectors.

It will be appreciated that changing the quadratic chirp element of the combined chirp changes the plane in the scene that is focused to the imaging plane of the optical assembly. By successive imaging with different chirps 42 it is possible to build up a 3-D picture of the scene. This can be done with a 1-D array of sensors, for example similar to that shown in FIG. 5, or using a 2-D array of sensors, for example a CMOS or CCD camera, or a single detector.

It will also be appreciated that if no off-axis "steering" of the region of 3-D space in the scene to be focused onto the imaging plane is required no linear grating may be used on the SLM (or as part of the combined chirp).

If no change of imaged plane in the scene being imaged is required there may be no quadratic chirp, or the quadratic chirp may not change.

It will also be appreciated that the plane in 3-D space of the scene that is brought into focus on the imaging plane of the optical assembly does not have to be a flat planar plane. It can be a surface, which can be curved or contoured. An appropriate combined chirp/pattern displayed on the SLM can bring practically any surface in the scene to be focused on the imaging plane in the optical assembly. It may do this by building up a complex surface by imaging scene pixels sequentially in time and changing the distance/orientation of the imaged plane between scene pixels. Using an SLM to steer and focus a beam of light, and having the SLM computer controlled and able to respond/steer very fast in real time, allows the SLM to act as a rapidly controllable, and very flexible, optical device.

Figure 3:
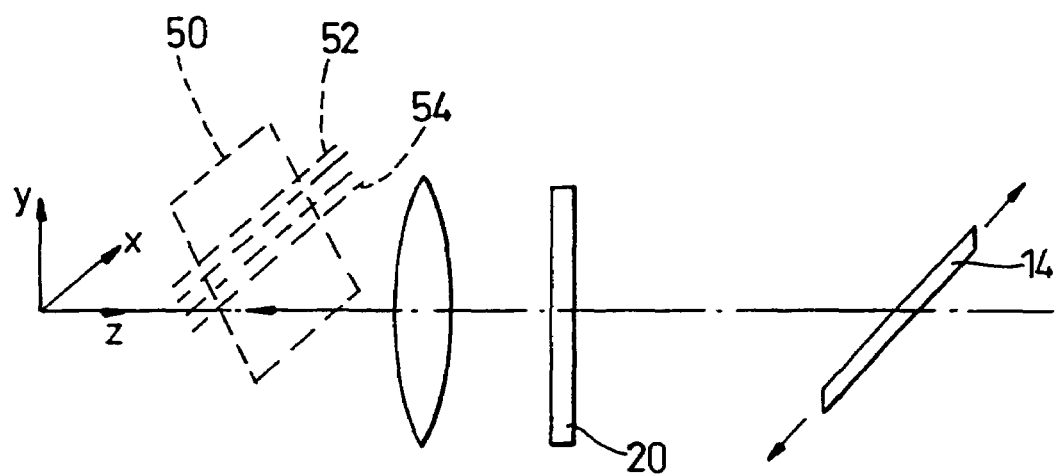

FIG. 3 illustrates the above by altering the combined chirp on the SLM to project onto the linear array 14 different "slices" of an inclined plane 50 (inclined to the plane normal to the optical axis), the slices that are in the imaged plane in 3-D space being at different depths/distances from the array 14, the detector array detects sequentially in time "slices of the scene" over the inclined plane. For example one slice 52 at a first distance (controlled by the chirp 42) is followed by another slice 54 at a different scene imaged plane (using a different chirp 42).

Although the imaging plane in the optical assembly is envisaged primarily as being a flat plane, it too might be non-flat, and might be curved.

The combined chirp displayed on the SLM is programmably controlled by the computer and different slices of an imaged plane can be sampled by the 1-D array at different times to build up a picture of the surface chosen to be the imaged surface. The slices sampled sequentially in time do not have to be adjacent in 3D space, but may typically be so. By controlling the spacing between the lines of the displayed diffraction grating element 40, and the orientation of the lines on the SLM, the computer can control how off-axis is the region of the scene that is focused to the imaging detector 14.

It will also be appreciated that the 1-D array of sensors could comprise a single sensor (i.e. a 1 element array). The desired part of the surface to be imaged would then be stepped across the sensor in two transverse directions by the SLM (probably two orthogonal directions).

Figure 2:
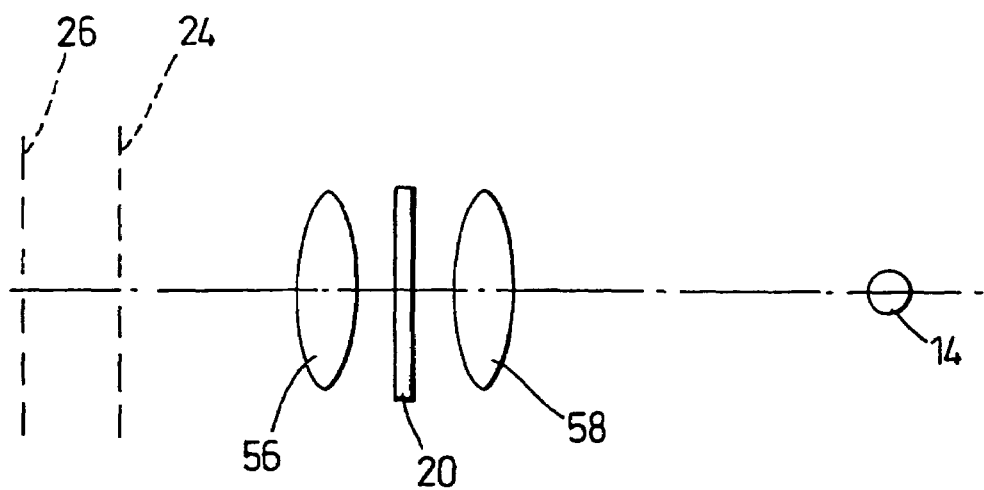

FIG. 2 illustrates a different optical arrangement where there is a lens 56,58 before and after the SLM 20.

In FIG. 4, the fact that the individual detector pixels/sensor elements 16 are each separately addressed by read-out circuitry makes it possible to read out all of the sensor elements in parallel. This speeds up read out. Furthermore, it is possible to read out some only (and not all) of the sensor elements 16. This may facilitate rapid scanning of images and/or produce a fast imaging system. The control computer can determine which sensor elements are read, and when, depending upon the requirements of the user of the optical system. The control computer may be programmable by a user, or a user may be able to select between a plurality of predetermined pre-existing programmes.

The arrangements of FIGS. 4 and 6 enable a 1-D array of sensors (or a single sensor) or a 2-D simple array of sensors to be used. This can be desirable in certain applications, especially where fast read out is important. Having a simple array is advantageous because simple arrays allow substantially all detectors to be read out in parallel.

FIGS. 10a to 10d show examples of "simple" 2-D detector arrays. The detector elements are referenced 100 and read out/possibly some initial processing or amplification circuitry is referenced as 102 (shown only in FIG. 10a). Simple arrays are capable of having substantially all of the detector elements 100 read out in parallel. Complex arrays, with detector elements surrounded by many other detector elements have difficulty getting individual read out of "buried" detector elements in central regions of the 2-D arrays. Some simple arrays have all, or nearly all, of their detector elements at the periphery of the array (this means that the electronics can be beyond the periphery in the same plane/intersecting the plane of the detector elements). It may be possible to have a limited number of detector elements read out sequentially and still get fast overall performance. For example, if the read out were pairs of detector elements, so there were only two to be read serially (but this would be slower than true parallel read out of all detector elements). It may be possible to have just one or two detector elements within an outer peripheral line of detector elements and still have room for circuitry for parallel read out.

Figure 9:
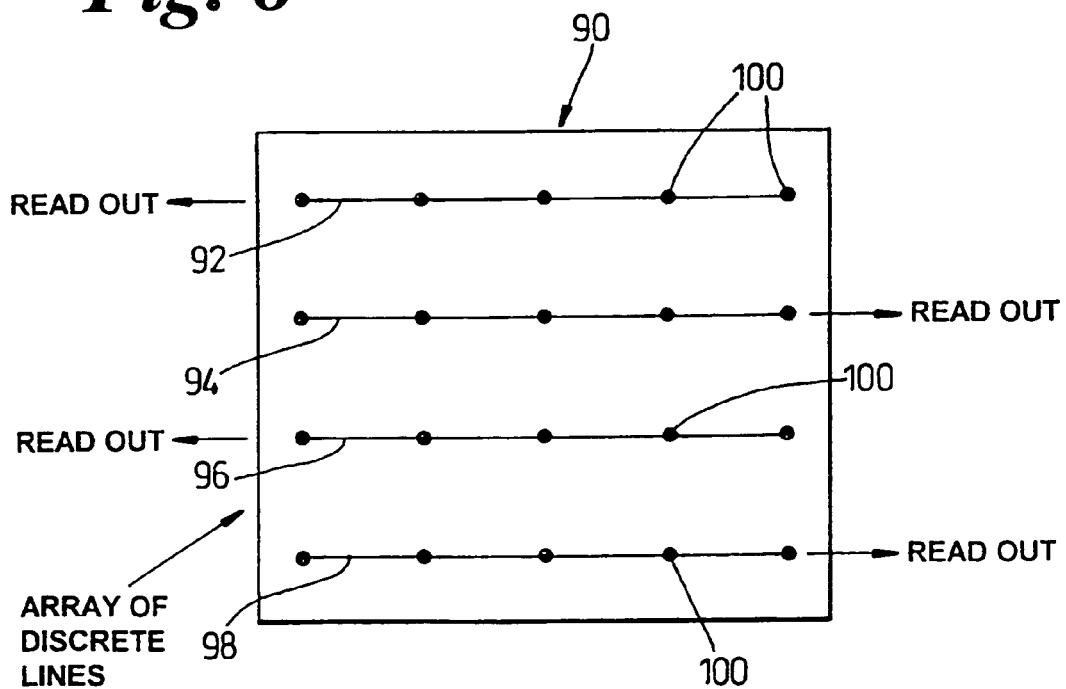
FIG. 9 shows a detector imaging array.
Figure 10A:
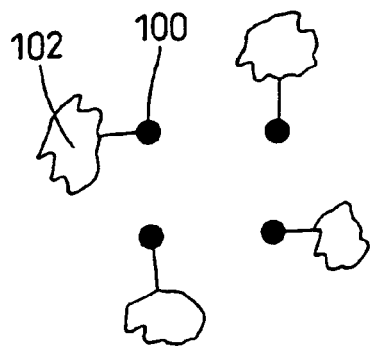
FIGS. 10a to 10d show other detector arrays.
Figure 10B:
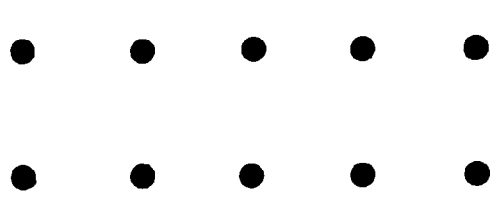
Figure 10C:
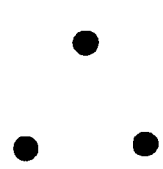
Figure 10D:
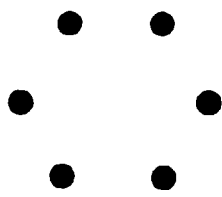

FIG. 9 shows a 2-D imaging detector array 90 having separate lines 92,94,96,98 of detector elements 100 forming a grid. Each line is read out separately, and in this embodiment alternate lines read out in the opposite direction (this allows the read-out electronics to have more space).

Although in FIG. 7 the memory with a plurality of linear and chirp combinations is presented as having stored pairs of linear and chirp functions (and it may indeed have this), it is also conceivable that the memory may have a library of linear gratings, a library of chirps, and that the computer may select from each group to make a combined chirp. The pattern may be combined prior to display or actually only upon display.

The use of a linear component in the combined chirp (to orientate the direction of view of the assembly off-axis) may not be necessary if the system has a 2-D detector (but it might still be used).

With reference to FIGS. 9A to 9C of PCT/GB 98/02876, the concept of moving light sources relative to a detector array in order to scan an image over the array applies to imaging a scene by realising that each "pixel" or small region of a scene can be seen as a light source, and focusing a sequence of chosen light sources/scene regions onto the detector array (using the SLM) uses the same scanning concept. By controlling the pattern on the SLM it is possible effectively to leave turned "on" a region of the scene (in focus on the detector) whilst turning "off" other light sources/regions of the scene.

Figure 8:
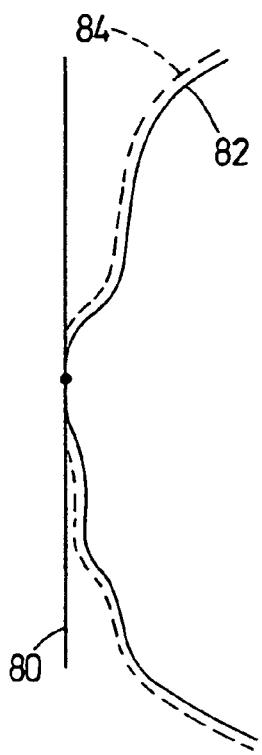
FIG. 8 shows schematically the aberration of an optical system and how the present invention can map the sensor plane of the optical assembly to the aberration.

FIG. 8 illustrates a possible application of the invention. Many optical systems have optical aberration, typically due to the combination of the aberration of a number of different optical components (for example in FIG. 1, the lens 22 and the SLM 20 may have an associated aberration). The overall aberration of a system means that different regions of a scene plane are not focused properly on an imaging plane. Plane 80 of FIG. 8 represents the imaging plane of a camera, and surface 82 represents the surface to which a flat plane in a scene is focused. It is possible to apply a combined chirp to the SLM to compensate for the aberration of the rest of the system. Line 84 represents how a combined chirp applied to the SLM 20 effectively modifies the imaging detector plane of the system (or looked at another way, how it modifies the plane in the scene that is focused onto the detector plane). Thus, once the aberration of a system is known it is possible to ameliorate, or substantially eliminate, the aberration using the combined chirp pattern.

Alternatively, different combined chirp patterns can be used to compensate for different regions of the aberrated image.

The principle of compensating for aberration using the SLM and combined chirp can be used to compensate for aberration in two dimensions.

The invention has applications in many areas. A programmable lens is one application. Since an SLM can display thousands of patterns a second, possibly tens of thousands, or of the order of a hundred thousand, or more, it is possible to vary the programmable lens very fast (many thousands of times a second).

In one application, pattern recognition, there is a requirement for fast 2-D sensors capable of thousands of frames/sec (possibly ten thousand frames/sec or more). There is also a drive in the art of pattern recognition towards increasing the number of pixels needed in the 2-D array. The present invention allows the number of pixels forming the image to be increased or decreased by using appropriate combined patterns on the SLM. Each imaged frame of the scene needs to be processed (e.g. digitally processed) serially. There are cameras which store data this fast, or faster, but which are processed off-line. In our earlier-filed patent application PCT/GB98/02876 (and incorporated herein by reference) is a technique which effectively scans a pattern across a 1-D sensor array by employing a 1-D array of light sources (e.g. VCSELs). This is effectively a series of point sources. Each point source is at different angles relative to the optical axis. Hence the 1-D sensor array (which is oriented perpendicular to the light source/VCSEL array) perceives the pattern displayed on the SLM to move across it if the light sources/VCSELs are switched on one after the other. The number of light sources determines have many linear slices of a 2-D pattern are detected by the sensor.

If a linear diffraction grating is displayed on the SLM (can be phase or amplitude) this causes a plane wave light beam to be deflected. The similarity with the light source/VCSEL array discussed above is that an image can be considered as a 2-D array of point sources. By changing the diffraction grating displayed on the SLM the scene can be scanned across a sensor array in the x-y plane. If a quadratic diffraction grating is used instead of or in addition to the linear grating on the SLM then a 3-D scanning can be achieved. Combining a programmable chirp with a sensor array enables 3-D imaging to be achieved. As shown schematically in FIG. 3 it is possible to image any x-y-z plane or indeed any curved surface by suitably choosing the appropriate chirp combinations. Post-processing can reconstruct a 3-D scene.

The chirp can be used to scan the image of a scene across a detector array (the detector array may be, for example, a 1-D array or a single element detector) in any combination of x-y motion.

Some SLMs are wavelength sensitive. It may be desirable to illuminate the scene with a single wavelength light (e.g. laser) and/or filter the light incident on the SLM to make it substantially monochromatic.

It may be desirable to use filters of different colours (e.g. red, blue, green) and build up a colour image. Some SLMs, for example those based on technologies such as micromachined silicon, could be programmed to function with different wavelengths. This may give hyperspectral or colour capacity.

The invention is applicable in principle to all e.m. wavelengths, not just truly optical wavelengths. The term "optical" should be interpreted to cover e.m. radiation generally. It may even be possible to perform the invention with waves that are not e.m. waves (e.g. ultrasound or acoustic, or compressive waves). Again the invention should be interpreted broadly in this regard.

There may be an illumination source for the scene, or for the SLM (or both), or there may not be.

Currently 1-D CCD sensors are commercially available with 200 MHz pixel read out rate (Dalsa). 100 MHz 2-D sensors are available and presumably 200 MHz soon. However, they are inflexible because all pixels must be read out each frame. The fast read out rates are possible by designing multiple output taps; these split the device into parallel read out regions each with a plurality of sensor pixels. Each tap could be designed to be controlled independently but there is a limit to how may taps can be used: there is not enough space physically for the read-out circuitry. Research is studying flipchip bonding for full parallel read out—but this will be expensive and consume a lot of electrical power. A 1-D array (or simple array), as now proposed, with full parallel read out is much easier to design and in combination with the combined chirp allows the possibility of full control of localised read out of an image. It is not necessary to have to read out all of the resolvable pixels of an image.

The spatial light modulator (SLM) may comprise a high speed light modulating array such as the Fast Bit Plane Spatial Light Modulator (FBPSLM) described in our earlier publication [see references 7 and 8 of PCT/GB98/02876]. It may comprise an array of a ferro-electric liquid crystal material which may be provided on a substrate.

The SLM may comprise an array of pixels or elements which can be switched between at least a first state in which light passes through the element whilst being modulated in a first way, and a second state in which light passing through the element is modulated in a second, different way. In each case, the light may be either retarded or amplitude modulated, or both. Preferably, each element comprises a liquid crystal pixel. The SLM may be either transmissive or reflective in operation. There may be substantially a 180° phase difference between light that has interacted with a pixel in the first state compared with light that interacts with a pixel in the second state.

The SLM may be a transmission device, such as a liquid crystal, or a reflective device, such as a micromachined mechanical device (e.g. electronically-controlled movable members which reflect light). For some reflective devices the light does not "pass through" it (but for others it does—e.g. LC plus mirror), and perhaps a more general term would be that the light interacts in a plurality of ways with the device depending upon the condition of regions of the device.

In a refinement, the lens may be integral with the SLM itself.

As discussed in PCT/GB98/02876, the present invention can be used in pattern recognition, with a programmable chirp/SLM, possibly capable of changing its chirp/combined chirp many, many, times a second.

Another advantage which has been demonstrated is that the application of a chirp signal allows slightly non-planar SLMs to be used while still producing a usable optical output (for example a correlation pattern or other use for the programmable SLM). Such non-planar SLMs can arise through imperfections in the manufacturing process, and are much cheaper than optically flat SLMs, since the latter have lower yield.

The chirp/combined chirp compensates for aberrations, as discussed earlier, which allows the use of SLMs that are less than optically flat, in a variety of applications. Indeed, a further way of looking at one aspect of the invention is as a way of using less perfect SLMs than has hitherto being possible, by compensating for optical imperfections by applying a pattern to the SLM.

Experiment has shown that for pattern recognition the chirp combination should, ideally, be added before the pattern is binarised and can be added to both patterns or to only one of the patterns. It is probably more convenient to pre-calculate the pattern and add it to the reference pattern. It is therefore possible to compose a set of patterns with different chirps so that the chirp can be chosen randomly from a list in real-time or sequentially to produce a scanning focus in the z-direction. Combination of a linear and quadratic (or higher order) pattern allows the focus to be varied in three dimensions in real-time. For example, the current design of the FBPSLM allows the chirp pattern to be changed approximately ten thousand times per second. Applications could include the memory access of optical discs and holographic memory without the requirement for mechanically moving parts.

In some applications a variable chirp may be required, for example, time/frequency analysis in Wigner Transform or Ambiguity function, where an unknown chirp may be present in the input signal. The purpose of applying additional chirps is to find the one which negates the unknown chirp in order to retrieve a desired signal.

The chirp could also be used by an SLM with more than two modulation levels (i.e. not binary). This would have the advantage that multiple modulation levels produce only one correlation peak (in pattern recognition) and the optical throughput is therefore more efficient. Although the ambiguity of sought-object location is removed by having only one correlation peak there is still a problem caused by the presence of a DC peak.

It should also be noted that the chirp has a similar mathematical description to a lens and it has been shown experimentally that it is not necessary to use a lens in conjunction with the chirp. This simplifies the optical system design.

One area where time/frequency analysis using an optical assembly having a programmable chirp-driven SLM might be used is if an electromagnetic signal encoding data (or not) were emitted from a moving platform it would be chirped (quadratic function) if the platform were accelerating/decelerating. By applying a corrective chirp in return to a "correct" signal, it is possible to clean up the signal, and (or instead) to determine the acceleration/deceleration of the platform by a knowledge of which corrective chirp successfully compensated (the library of corrective chirps would have an associated acceleration with each chirp). Alternatively, the de-chirping chirp could be calculated by a computer upon analysis of a received chirped signal. A signal may be deliberately chirped for transmission and de-chirped at the receiving end.

Although a "pixel" is referred to, and although the SLM is primarily intended to have pixels (discrete controllable areas provided in an array), it is also intended that "pixel" be interpreted broadly enough to cover non-pixellated devices (not truly pixellated), such as optically addressed SLMs incorporating a photoconductor or other photosensor.

In many applications the optical system will be an imaging system, but perhaps in not all.

Although "the display of the SLM" is referred to it will be appreciated that this term also covers the light-modifying properties of SLMs which have an operative surface which has regions capable of introducing different phase or amplitude changes on incident e.m. radiation, such as movable mirror or movable piston-type reflective SLMs, as well as transmissive SLMs.

There are times when the demands of technology change and there is an increasing demand for greater resolution in electronic imaging devices. This is traditionally addressed by providing more and more pixels in the detector array. Seemingly, however big the detector array, and whatever its resolution, a better one is always wanted within a few years. The finite number of detector elements in the detector array limits image resolution.

The present invention also has application in ameliorating this problem. Because the computer controller effectively pixellates the scene being observed and scans it over a fixed array of detectors (or even a single detector), it is the computer which determines (in part) resolution, since it determines the number of image pixels created by controlling the x-y scan.

Figure 11:
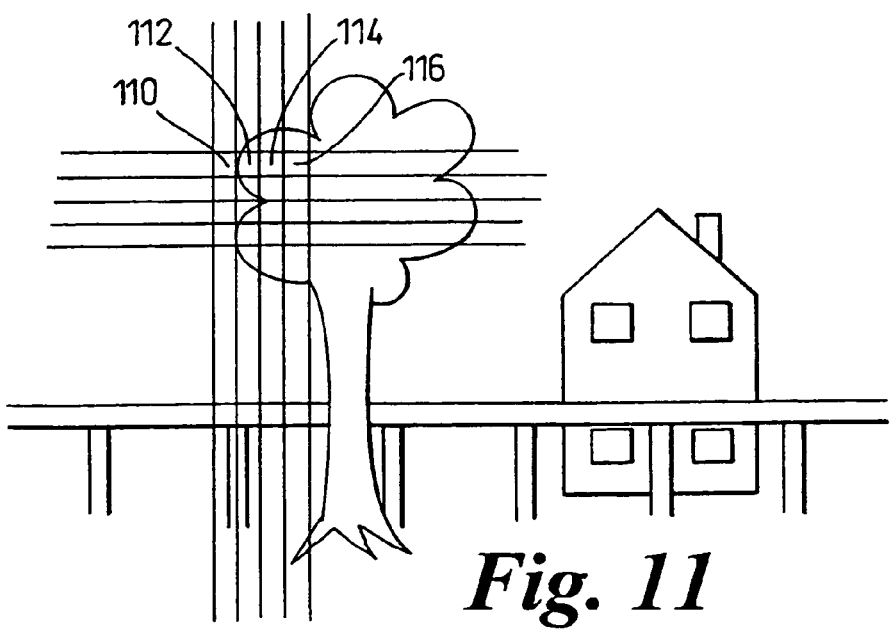
FIG. 11 shows schematically a scene being observed by an instrument according to the present invention and illustrates how the scene can be divided into pixels in the x-y plane, and indeed z direction, which are scanned over the instrument's detector array.
Figure 12A:
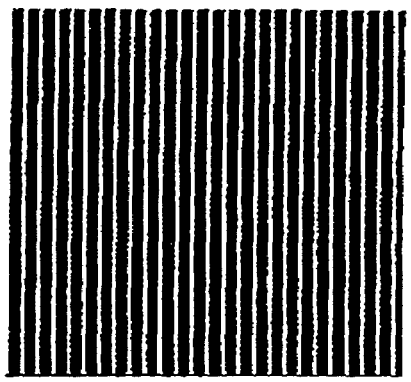
FIGS. 12a to 12e show a linear pattern, a quadratic pattern, a cubic pattern, a binary combined linear and quadratic pattern, and a binary combined quadratic and cubic pattern.
Figure 12B:
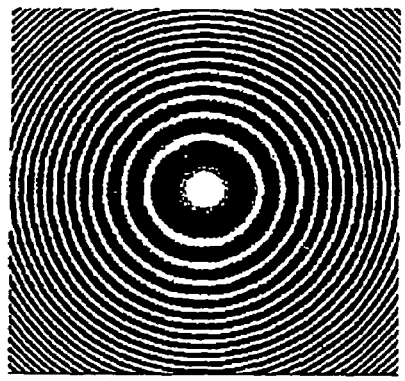
Figure 12C:
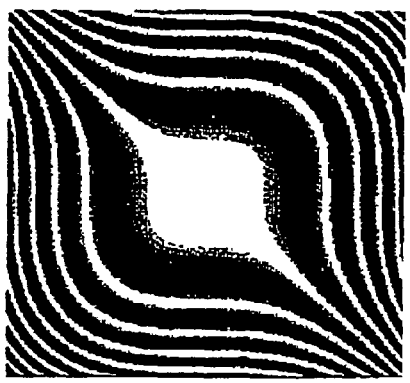
Figure 12D:
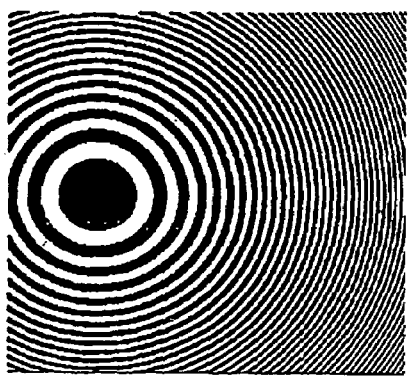
Figure 12E:
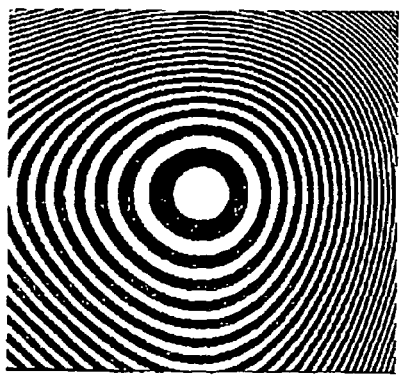

FIG. 11 illustrates a scene being imaged by a camera in accordance with the present invention. Scene "pixels" 110, 112, 114, 116 are regions in 3-D space which are directed (almost always focused) onto the detector array/detector of the camera by the SLM. Changing the resolution of the scene pixels is effected by a change of commands from the computer to the SLM (and so better resolution can be achieved without changing the detector array).

Figure 13:
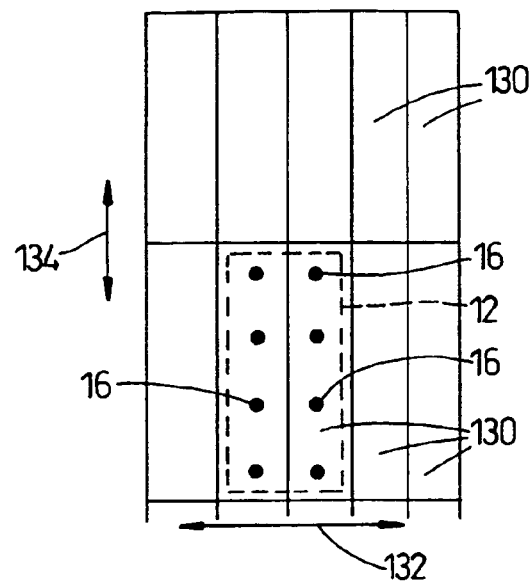
FIG. 13 schematically shows the stepping of scan of scene regions over a fixed detector array.

FIG. 13 shows a detector 12 having a small number of detector elements 16 and shows schematically areas 130 where light from computer-selected regions of 3-D space in the scene is directed/imaged. The computer/SLM scans the scene regions over the detector elements 16 in the direction of arrow 132 and in the transverse direction of arrow 134. As many image pixels are captures as are required.

Using the SLM to scan volumes of the 3-D scene onto the detector array (or single detector) allows the control of the number of pixels in the image picture to be computer-controlled, rather than being controlled by the hardware. The computer can control the SLM (or other scanner/focuser) to display a pattern to create a wider field of view for the image created. The computer can alternatively use patterns displayed on the SLM to achieve a greater resolution in the image produced by keeping its physical size/field of view the same but using an increase in the number of image pixels created by scanning the image over the detector to increase the resolution of the image. The computer could, of course, achieve both.

One reason why an optical system might be required with a variable resolution and/or variable field of view is if its numerical aperture was to be varied. It may be desirable to vary the aperture size of the system to change its depth of focus/depth of field (it may be desired to concentrate the imaging on things that are at about a specified distance from the optical apparatus).

Changing the aperture size changes the depth of focus. Reducing the aperture size increases the depth of field—reduces the resolution in the z direction that is required. Reducing the aperture size reduces the field of view required, and so fewer pixels are needed to form an image of any given resolution. If fewer pixels are required, the image can be created faster.

On the other hand, increasing the aperture size decreases the depth of field, and increases the field of view. More pixels in the image are required to image that field of view. In order to achieve an image in a predetermined time, the resolution may need to be reduced (or the larger number of scans of the scene required will add to the time taken to form the image).

The aperture, and aperture control, may be provided as a component spaced away from the scanner/SLM (either before or after the scanner), or it may be provided at the scanner/SLM. It may be provided at or near to the Fourier plane (e.g. in confocal microscopy an aperture control at the Fourier plane may be desirable).

It may be helpful to provide some definition of some of the terms used:—

"combined chirp"—this can be a combination of linear, quadratic, cubic, or higher order patterns, or a modified pattern which is substantially similar to such a combination;

"optics"—the invention applies to any radiation wavelength for an electromagnetic radiation, and to compressive waves;

"imaging"—this can be to the image plane of an optical device, or to a Fourier transform plane, or to a plane which is neither;

"focusing"—a plane where the detectors are placed and receive radiation;

"colour"—not just optical (red, green, blue) but can be multiple wavelengths;

"simple array"—an arrangement of detectors which allows parallel read out by electronics—for example one where all or substantially all detectors are at the peripheral edge of the array.

The invention claimed is:

1. An optical assembly for observing a scene comprising an optical input to the assembly, said assembly comprising:
   a spatial light modulator (SLM),
   a controller controlling the display of the SLM, and
   a detector; wherein the controller modifies a pattern displayed on the SLM to sequentially scan radiation from said observed scene across the detector, said radiation scanned from a plurality of different angular regions or depth regions in 3-D space of the scene or a surface region through the 3-D space that the optical assembly is observing, wherein the pattern displayed on the SLM has a component comprised of a substantially linear diffraction grating pattern and a component comprised of a substantially chirp function.

2. An assembly according to claim 1 in which the controller controls the SLM so as to scan different angular portions of the scene (angularly disposed in azimuth and/or ascension relative to the optical axis of the assembly).

3. An assembly according to claim 1 or claim 2 in which the controller controls the SLM so as to focus different depth regions of 3-D scene space over the detector.

4. An assembly according to claim 1 in which angular portions are scanned by modifying the linear component of a combined linear function and chirp function.

5. An assembly according to claim 1 in which different depth regions are focused by displaying patterns with different combined chirp functions.

6. An assembly according to claim 1 in which the controller has a library of possible linear and/or quadratic or higher order functions and a selected combination of linear and quadratic or higher order functions from the library are, in use, applied to the SLM.

7. An assembly according to claim 1 in which the detector comprises a line array of detector elements or a simple array of detector elements and the controller is adapted to control the display on the SLM to scan the scene image over the detector array in a direction generally transverse to the direction of the line array, or transverse to the elongate direction.

8. An assembly according to claim 1 in which the radiation from the selected surface or region in 3-D space in the scene is focused onto the detector.

9. An assembly according to claim 1 in which the pattern on the SLM is capable of being changed at least a thousand times a second.

10. An assembly according to claim 1 in which points in 3-D space are sequentially in time directed, or focused, onto a detector, the SLM being programmed by the controller to direct, or focus, different points in space onto the detector at different times.

11. A method of directing a scene image onto a detector comprising using a programmed SLM controlled by a controller to control the x-y part of the scene image that is directed onto the detector and/or the imaged plane of the scene in the z direction that is in focus, the direction between the scene and the detector being in the z direction, in which the display on the SLM is programmably controlled by a controller by application of a chirp and/or a linear grating to the SLM so as to scan the scene image over the detector over time, with the controller taking time-spaced records of what the detector detects.

12. A method according to claim 11 in which the orientation of a linear grating and/or the spacing of the lines of the grating are controlled so as to control the location of the region of the scene that is directed onto the detector.

13. A method according to claim 11 in which the chirp is used to determine the distance from the detector of the plane in 3-D space in the scene that is focused to the detector.

14. A method according to claim 11 in which the programmed SLM compensates for aberration in an optical system.

* * * * *